United States Patent [19]

Dohi et al.

[11] Patent Number: 4,883,366
[45] Date of Patent: Nov. 28, 1989

[54] TEMPERATURE SENSOR

[75] Inventors: Katsuji Dohi, Kyoto; Akira Kumada; Michihiro Murata, both of Kanagawa, all of Japan

[73] Assignee: Murata Mfg. Co., Ltd., Kyoto, Japan

[21] Appl. No.: 250,738

[22] Filed: Sep. 28, 1988

[30] Foreign Application Priority Data

Sep. 29, 1987 [JP] Japan .................. 62-245270

[51] Int. Cl.$^4$ ............................. G01K 7/34
[52] U.S. Cl. ................... 374/184; 374/183; 331/66; 361/282
[58] Field of Search .......... 374/163, 183, 184; 331/66; 361/282

[56] References Cited

U.S. PATENT DOCUMENTS

| | | | |
|---|---|---|---|
| 2,659,801 | 11/1953 | Collins | 374/184 |
| 3,260,116 | 7/1966 | Grady, Jr. | 374/183 |
| 3,851,320 | 11/1974 | Dahl | 331/66 |
| 4,109,292 | 8/1978 | Shibayama et al. | 361/302 |
| 4,213,797 | 7/1980 | Sher | 361/282 |
| 4,247,881 | 1/1981 | Coleman | 361/302 |
| 4,267,634 | 5/1981 | Wellard | 361/321 R |
| 4,545,254 | 10/1985 | Lawless et al. | 374/184 |
| 4,574,255 | 3/1986 | Fujii et al. | 331/66 |
| 4,642,732 | 2/1987 | Ikeda et al. | 361/321 CC |
| 4,654,750 | 3/1987 | Kumagai | 361/321 CC |
| 4,720,766 | 1/1988 | Honda | 361/321 F |
| 4,723,193 | 2/1988 | Chazono et al. | 361/321 |

Primary Examiner—William A. Cuchlinski, Jr.
Assistant Examiner—Diego F. F. Gutierrez
Attorney, Agent, or Firm—Koda & Androlia

[57] ABSTRACT

A temperature sensor includes a capacitor having electrodes between which a dielectric body having its dielectric constant variable depending on the variations of ambient temperature is interposed, and a CR oscillating circuit utilizing the capacitor. The dielectric body is made of a ceramic dielectric material which has a working temperature range in the normal dielectric phase with the dielectric constant thereof having a temperature coefficient ranged between $-1,000$ ppm/°C. and $-10,000$ ppm/°C. The ceramic dielectric body is also used as a substrate on which the CR oscillating circuit is formed.

5 Claims, 2 Drawing Sheets

FIG. 1
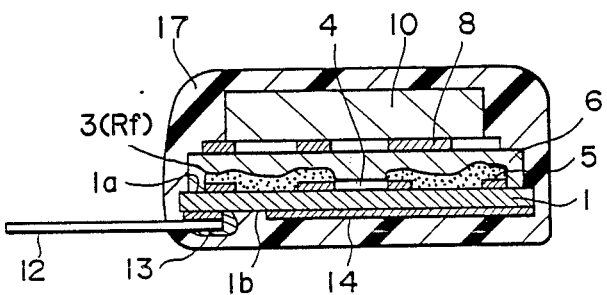
FIG. 3
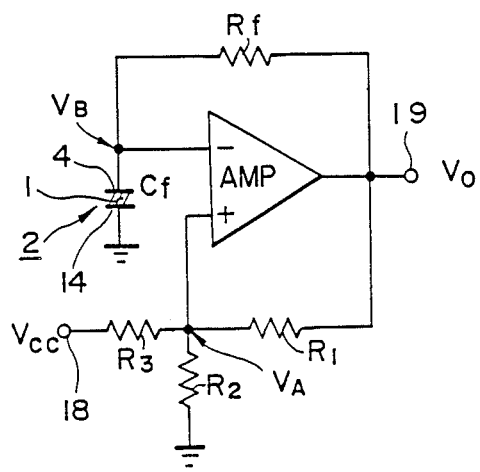
FIG. 4

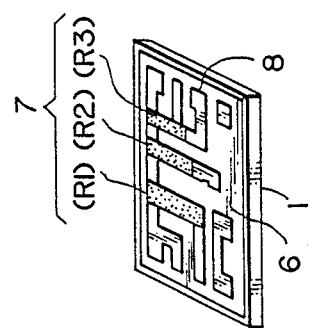
FIG. 2(d)
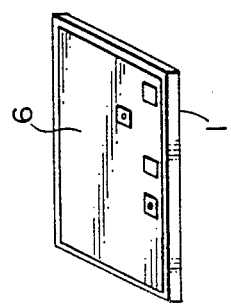
FIG. 2(c)
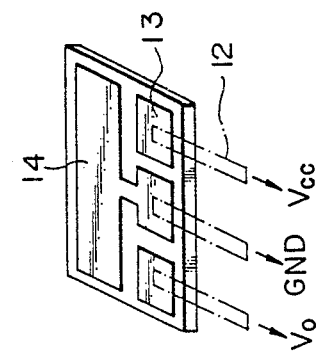
FIG. 2(g)
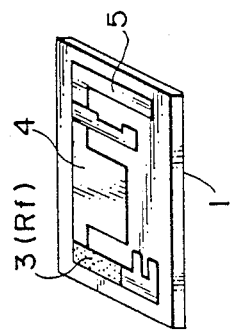
FIG. 2(b)
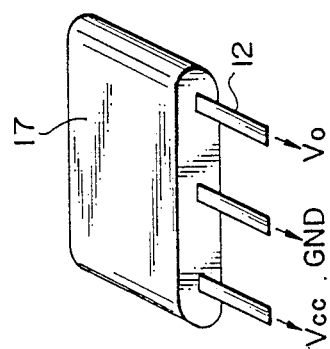
FIG. 2(f)
FIG. 2(a)
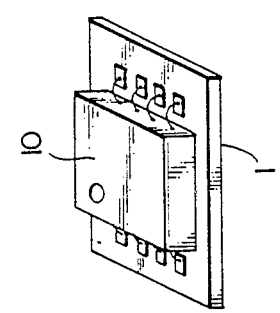
FIG. 2(e)

TEMPERATURE SENSOR

BACKGROUND OF THE INVENTION

1. Field of the Invention

The present invention relates to a temperature sensor utilizing a dielectric body which has its dielectric constant varying depending on the variations of temperature.

2. Description of the Prior Art

Temperature sensors have been used in many electric home appliances such as refrigerators, air-conditioners, electric rice-cookers and others. The temperature sensor is adapted to detect and control the temperature in the electric home appliance.

Such temperature sensors includes a thermocouple type sensor adapted to generate an electromotive force corresponding to a difference between a reference temperature and a detected temperature and a platinum resistor or thermistor type sensor adapted to detect a varied temperature as a change in the resistance.

The thermocouple type sensor must have a certain amplifier since the electromotive force produced from the difference in temperature is very small. This means that the entire construction is more complicated and increased in manufacturing cost.

Although the platinum resistor type sensor can detect the temperature with very improved accuracy, it has a disadvantage in that the manufacturing cost thereof is correspondingly increased. The conventional electric home appliances do not require such an accuracy as provided by the platinum resistor type sensor and rather desire the reduction of price with a relatively reduced accuracy.

Since the thermistor type sensor has a relatively high accuracy of temperature detection with a relatively low manufacturing cost, it has been broadly used various appliances. However, the thermistor type sensor has a problem when its output detection signal is processed by the use of the micro-computer.

With the recent development of the micro-computer, it is progressively increased that the micro-computer receives and processes data from the temperature sensor. In such a case, since the output signals of the thermistor are generally provided as analog voltage signals, these analog signals must be converted into digital signals by a A/D converter prior to processing at the micro-computer. This means that the signal processing operation becomes more complicated.

Noises may be frequently included in the analog signal system from the thermistor to the A/D converter to degrade S/N ratio.

SUMMARY OF THE INVENTION

It is therefore an object of the present invention to provide a temperature sensor which has such an accuracy of detection as required for control of temperature in electric home appliances, which output signals can easily be processed by the micro-computer and which can be manufactured economically.

To this end, the present invention provides a temperature sensor which comprises a capacitor including a pair of opposed electrodes and a dielectric body interposed between the opposed electrodes and having its dielectric constant variable depending on the variations of ambient temperature, said capacitor being used to form a CR oscillating circuit, said dielectric body being a ceramic dielectric body having its working temperature region in the normal dielectric phase and a coefficient of temperature for the dielectric constant which is ranged between −1,000 ppm/°C. and −10,000 ppm/°C., said ceramic dielectric body being used also as a substrate on which said CR oscillating circuit is formed.

In such an arrangement, the dielectric constant of the ceramic dielectric body is varied depending on the variations of temperature in the region to be sensed. Thus, the electrostatic capacity of the capacitor is correspondingly changed to vary the time interval between the charge and discharge of that capacitor in the CR oscillating circuit. This change will appear as a change in frequency for the output signal of the sensor. By detecting such an oscillating frequency in the CR oscillating circuit, therefore, the temperature can be determined in the desired region.

BRIEF DESCRIPTION OF THE DRAWINGS

FIG. 1 is a cross-sectional view of one embodiment of a temperature sensor constructed in accordance with the present invention.

FIG. 2 illustrates the steps of manufacturing the temperature sensor shown in FIG. 1.

FIG. 3 is a circuit diagram of the CR oscillating circuit.

FIG. 4 is a cross-sectional view passing through a contact section connecting between the first and second conductive patterns.

FIG. 5 is a time chart illustrating the operation of the temperature shown in FIG. 1.

FIG. 6 is a graph illustrating the output characteristics of the temperature sensor shown in FIG. 1.

FIG. 7 is a graph illustrating the relationship between the temperature and the specific dielectric constant in the ceramic dielectric body.

DETAILED DESCRIPTION OF THE PREFERRED EMBODIMENT

Referring now to FIGS. 1 and 2, there is shown a ceramic dielectric body 1 which is ground into 0.5 mm thickness by any suitable grinding manner such as lapping and severed into a rectangular plate having its dimensions of 5 mm×8 mm, as shown in FIG. 2(a). The ceramic dielectric body 1 serves as a dielectric for a capacitor 2 in a CR oscillating circuit shown in FIG. 3. The term "CR oscillating circuit" in the present invention is referred to as an oscillating circuit which includes a positive feedback consisting of capacitances and resistances.

The ceramic dielectric plate 1 also is used as a circuit substrate. On one side 1a of the ceramic dielectric plate 1 are printed and baked a first resistor 3 (resistor $R_f$ in FIG. 3), one of the electrodes 4 in the capacitor 2 and a first electrically conductive pattern 5 connecting the first resistor 3 with the capacitor 2, all of which are parts of the CR oscillating circuit, as shown in FIG. 2(b). For example, the electrode 4 is of a size of about 2 mm×about 2 mm. In the present embodiment, some of resistors $R_1$, $R_2$, $R_3$ and $R_f$ defining the CR oscillating circuit, for example, resistors $R_f$ are formed directly on the surface of the ceramic dielectric plate 1 from the resistor paste by means of the printing and baking technique. The electrode 4 is formed by screen printing an electrode pattern from a material consisting of silver and palladium on the surface of the ceramic dielectric plate 1 and then baking the electrode pattern at a temperature equal to about 850° C.

All the first resistor 3, electrode 4 and first electrically conductive pattern 5 formed on the ceramic dielectric plate 1 are covered with an electrically insulating layer 6, as seen from FIG. 2(c). The insulation layer 6 is formed by printing an electrically insulating material on the aforementioned resistor 3 and other components and baking it after dried. In the present embodiment, a plurality of such insulating layers 6 are formed one above another repeatedly (for example, two or three times) into a relatively thickened lamination so that the insulation failure can be positively prevented. Further, the insulating layer 6 is pre-formed with openings at positions corresponding to through holes which are used to connect some parts on one side of the substrate 1 with the respective parts on the other side of the same.

On the opposite or exterior surface of the insulating layer 6 are formed the other resistors of the CR oscillating circuit, that is, second resistors 7 ($R_1$, $R_2$ and $R_3$) and a second electrically conductive pattern 8 connected with the second resistors 7 in the same manner. On the second conductive pattern 8 is soldered a mini-flat package 10 of IC as an active component, as seen from FIG. 2(e). The mini-flat package 10 includes an operational amplifier 11 integratedly formed therein.

On the opposite face 1b of the ceramic dielectric plate 1 is similarly printed and baked an electrically conductive pattern portion 13 for attaching leads 12 thereto and the other electrode 14 of the capacitor 2, as seen from FIGS. 1 and 2(g). In the present embodiment, said other electrode 14 is formed substantially over the overall surface of the face 1b of the ceramic dielectric plate 1 and also grounded to provide a ground electrode (GND electrode). As seen from FIG. 3, the substrate 1 also includes electrodes to be connected with a Vcc input terminal 18 and a Vo output terminal 19, respectively.

As shown in FIG. 4, the insulating layer 6 is formed with a through hole 15 in which an electrically conductive contact portion 16 is formed in the form of a via-hole electrode. The first conductive pattern 5 is electrically connected with the second conductive pattern 8 through the via-hole electrode 16. In FIG. 4, the ceramic dielectric body 1, mini-flat package 10 and others are omitted. The first conductive pattern 5 also is electrically connected with the conductive pattern portion 13 through a through-hole electrode (not shown). Thus, the CR oscillating circuit will be formed on the ceramic dielectric plate 1 in the form of an integral lamination. The overall surface of the CR oscillating circuit is covered and protected with a dip paint layer (dip package) 17 of an electrically insulating plastic resin, as seen from FIG. 2(f).

The part of the ceramic dielectric plate 1 located between the electodes 4 and 14 serves as a dielectric in the capacitor 2. In order to cause the role of this dielectric portion to perform efficiently, the ceramic dielectric body 1 is so selected that it has a working temperature range for temperature detection in the normal dielectric phase and a temperature coefficient for dielectric constant which is ranged between $-1{,}000$ ppm/°C. and $-10{,}000$ ppm/°C. One of such ceramic materials is $(SrPb)TiO_3\text{-}Bi_3\,2TiO_2$.

In general, the ceramic dielectric has such a relationship between the specific dielectric constant $\epsilon_r$ and the temperature T as shown in FIG. 7. If it is desired to apply the dielectric to a capacitor for sensing temperature, it is required to use substantially linear parts of the curve shown in FIG. 7, that is, a linear portion A corresponding to the temperature range lower than the Curie temperature $T_c$ (and substantially proportional to the temperature T) and another linear portion B corresponding to the temperature range higher than the Curie temperature $T_c$ (and substantially proportional to $1/T$. However, the linear portion A is less stable in the temperature-specific dielectric constant characteristics and therefore not preferable for the dielectric in the temperature sensor. On the contrary, the linear portion B is more stable in the temperature-specific dielectric constant characteristics and preferable for the dielectric in the temperature sensor.

From the viewpoint of the sensitivity in the temperature detection, it is further preferable that the gradient in the linear portion B shown in FIG. 7, that is, temperature coefficient, is high as far as possible. On the other hand, there is also known dielectric materials having their working temperature ranges in the heavy dielectric phase. However, such dielectric materials are not preferable in that they are less stable in the relationship between the specific dielectric constant $\epsilon_r$ and the temperature. In view of this, the present invention utilizes a capacitor incorporating a ceramic dielectric body which has a temperature coefficient ranged between $-1{,}000$ ppm/°C. and $-10{,}000$ ppm/°C. and a working temperature range in the normal dielectric phase.

The above range of the temperature coefficient in the present invention is selected for the following reasons:

(a) If the temperature coefficient is larger than $-1{,}000$ ppm, the sensitivity of the temperature sensor decreases as the temperature coefficient approaches zero. It may be impossible to perform any practical detection of temperature.

(b) If the absolute value of the temperature coefficient is larger than $-10{,}000$ ppm/°C., the rate of variation increases up to unacceptable degrees for ceramic materials which have been developed up-to-dately.

Although the dielectric materials having their working temperature range in the normal dielectric phase includes organic materials such as plastics, the plastics cannot be printed and baked as electrically conductive patterns on the substrate since they may be fused at high baking temperatures. It is of course that the CR oscillating circuit may be two-dimensionally formed on the substrate in any suitable manner other than the printing and baking technique. However, this raises another problem in that the substrate should be increased in size, resulting in increase of the overall size of the temperature sensor. In accordance with the present invention, the temperature sensor can be provided by printing and baking the dielectric material on the substrate. As a result, the temperature sensor can be extremely easily manufactured in the form of a three-dimensional and integral lamination which results in decrease of the overall size of the temperature sensor.

In the present embodiment, the frequency of the CR oscillating circuit can be adjusted by changing the electrostatic capacity of the capacitor 2. Concretely, the electrostatic capacity of the capacitor 2 can be changed by trimming the grounded electrode 14 thereof to regulate the area of electrode. Other method of regulating the oscillating frequency includes the regulation of the level of resistance in the resistor $R_f$ or the combined resistors $R_1$, $R_2$ and $R_3$, as shown in FIG. 3.

Although the ceramic dielectric bulk is used to provide the substrate on which the CR oscillating circuit is formed in the present embodiment, the ceramic dielectric bulk may be replaced by a ceramic dielectric substrate which is integrally formed by providing a green sheet of ceramic dielectric, and printing and baking a plurality of layers from electrode and resistor pastes on the sheet. In such a case, the green sheet is prepared by grinding a ceramic dielectric material after calcination, adding an organic binder, water and an organic solvent into the ground material to form a mixture, pot powdering the mixture to form a slurry and sheeting the slurry by the use of the doctor blade process. Electrodes and resistors are screen printed in place on the substrate. The electrical connection between the layers on the sheet is accomplished through via-holes which are formed by the through-hole process. The frequency of the CR oscillating section can be more easily adjusted by forming and regulating a resistor $R_f$ on the substrate. Usually, the thickness of the green sheet may be equal to about 0.7 mm.

The temperature sensor constructed in the above manner will be further described with respect to its operation in connection with the CR oscillating circuit of FIG. 3 and a time chart of FIG. 5.

First of all, a reference voltage is applied to the input terminal 18 of the CR oscillating circuit. This voltage signal is then supplied to the plus terminal of the operational amplifier 11 through the resistor $R_3$. At this time, the voltage $V_A$ applied to the plus terminal is represented as square waves oscillating between the maximum voltage $V_2$ and the minimum voltage $V_1$ as shown in FIG. 5(a). On application of the reference voltage, an electric current will flow in the electrode 4 of the capacitor 2 through the resistor $R_f$ to charge the capacitor 2. On progress of the charge, the voltage on the electrode 4, that is, the voltage $V_B$ on the minus terminal of the operational amplifier 11 gradually increases from a point X to another point Y for a period of time between $T_1$ and $T_2$, as seen from FIG. 5(b). Thus, the operational amplifier 11 serves as a comparator which compares the voltage $V_A$ with the voltage $V_B$. If the voltage $V_A$ is higher than the voltage $V_B$, an output signal of voltage $V_{20}$ will be generated from the output terminal 19, as shown in FIG. 5(c). If $V_A=V_B=V_2$ at time $T_2$, the output signal of the operational amplifier 11 is inverted to generate an output signal of voltage $V_{10}$ between $T_2$ and $T_3$. At the time $T_2$, therefore, the capacitor 2 initiates its discharge from the point Y to a point Z. If $V_A=V_B=V_1$ at time $T_3$, the output signal of the operational amplifier 11 is again inverted to generate an output signal of voltage $V_{20}$. Thus, the capacitor 2 is recharged for a period of time between $T_3$ and $T_4$. By repeating a cycle consisting of the charge and discharge of the capacitor 2 and the signal inversion of the operational amplifier 11, square wave signal $V_0$ will be outputted from the CR oscillating circuit.

Since the specific dielectric constant $\epsilon_r$ of the ceramic dielectric body 1 varies depending on the variations of ambient temperature, the electrostatic capacity of the capacitor 2 also varies correspondingly. In other words, the electrostatic capacity of the capacitor decreases as the ambient temperature increases. Therefore, the time intervals on the charge and discharge correspondingly decrease to increase the frequency of the output signal from the output terminal of the CR oscillating circuit. On the contrary, as the ambient temperature decreases, the electrostatic capacity of the capacitor increases to decrease the frequency of the output signal from the output terminal of the CR oscillating circuit.

Thus, the present temperature can be determined by analyzing the frequency of the output signal from the CR oscillating circuit.

FIG. 6 illustrates the output characteristics of the temperature sensor constructed in accordance with the aforementioned embodiment of the present invention. The output characteristics were measured with respect to the temperature sensor which utilized a ceramic dielectric having its temperature coefficient equal to −4,700 ppm/°C.

As seen from FIG. 6, the temperature T is substantially proportional to the output frequency f through a temperature range between −20° C. and 120° C. This means that the temperature sensor according to the present invention can sufficiently meet the accuracy of detection required in various electric home appliances.

Since the present invention provides the CR oscillating circuit formed on the ceramic dielectric substrate 1 and the insulating layer 6 covering the surface of the same, the substrate itself can be reduced in size to decrease the overall size of the temperature sensor.

Since the CR oscillating circuit of the present invention is integrally formed by printing and baking the resistors and the conductive patterns on the ceramic dielectric substrate 1, it is not necessary to connect between various parts in the circuit through leads. This means that less noises penetrate into the circuit to provide a very reliable detection of temperature. Further, since one of the electrodes 14 of the capacitor 2 is formed on the ceramic dielectric substrate 1 over its area and yet connected with the ground, noises from the interior and exterior of the circuit can be caught by the grounded electrode. Therefore, S/N ratio in the oscillating circuit can be extremely improved to further increase the reliability on the temperature detection.

Although the present invention has been described as to the comparison of the reference voltage $V_A$ with the electrode voltage $V_B$ at the operational amplifier 11, the present invention is not limited to such an arrangement. For example, a separate comparator may be used to compare the voltage $V_A$ with the voltage $V_B$.

Although the present invention has been described as to the arrangement in which the electrodes 4 and 14 defining the capacitor 2 are provided on the opposite sides of the ceramic dielectric substrate 1, one of the electrodes 4 or 14 may be embedded in the material of the ceramic dielectric substrate 1 at a position opposite to the other electrode 14 or 4. Furthermore, all the electrodes and resistors may be embedded in a dielectric substrate having a laminated multi-layer construction.

Although the present invention has been described as to the temperature sensor including the circuit protecting dip-paint layer of plastic material, it may be replaced by the formation of a passivation film from aluminum nitride or silicon oxide by any suitable means such as CVD and the like. In the latter case, it is anticipated that the thermal capacity of the sensor can be reduced to improve the responsibility thereof relative to the variations of temperature.

As be apparent from the foregoing, the present invention can decrease the number of parts to be used and simplify the overall construction of the circuit. Further, since the ceramic dielectric body is superior in thermal resistance, the resistors and conductive patterns in the CR oscillating circuit can be integrally printed and baked, such that the circuit may more efficiently be manufactured with decrease of the size of the temperature sensor.

Since the temperature sensor of the present invention is so constructed that the frequency of the output signal can be varied depending on the variations of ambient temperature, the output frequency can be immediately counted by any counting circuit in a micro-computer if the output signals from the temperature sensor are inputted directly into the micro-computer. The resulting counts can be used to perform the instant determination of temperatures detected. Thus, the process of handling signals in the micro-computer can be promoted extremely. Furthermore, the present invention does not require any A/D converter which was absolutely required in the prior art. It is thus intended to simplify the construction of the apparatus and to reduce the manufacturing cost thereof.

Since the ceramic dielectric body used in the temperature sensor of the present invention has its working temperature range in the normal dielectric phase, it has its very stable variation in the specific dielectric constant relative to the variations of temperature. In addition, the sensitivity on temperature detection also is superior with an increased reliability of temperature detection since the temperature coefficient of the dielectric constant in the ceramic dielectric body is ranged between $-1,000$ ppm/°C. and $-10,000$ ppm/°C.

We claim:

1. A temperature sensor comprising a capacitor having electrodes between which a dielectric body having its dielectric constant variable depending on the variations of temperature is interposed, said capacitor being used to define a CR oscillating circuit, said dielectric body being made of a ceramic dielectric material which has a working temperature range in the normal dielectric phase and a dielectric constant having its temperature coefficient ranged between $-1,000$ ppm/°C. and $-10,000$ ppm/°C., said ceramic dielectric body being also used as a substrate on which said CR oscillating circuit is formed, said CR oscillating circuit being of a laminated construction which is formed by covering the surface of the ceramic dielectric body which an insulating layer and suitably printing and baking electrically conductive patterns and resistors on the surface of said insulating layer.

2. A temperature sensor as defined in claim 1 wherein said ceramic dielectric body has one surface on which a first electrically conductive pattern and a first resistor in the CR oscillating circuit are printed and baked, said one surface being further covered with the insulating layer, a second electrically conductive pattern and a second resistor being further printed and baked over the exterior surface of said insulating layer, said first electrically conductive pattern being electrically connected with said second electrically conductive pattern through a contact portion, and an amplifier of the CR oscillating circuit being electrically and physically connected with said second electrically conductive pattern.

3. A temperature sensor as defined in claim 2 wherein said CR oscillating circuit is wholly covered with a plastic material.

4. A temperature sensor as defined in claim 2 wherein the opposite surface of said ceramic dielectric body is formed with an electrically conductive portion for attaching leads and wherein substantially the overall area of said opposite surface except said electrically conductive portion is formed with a grounded electrode of said capacitor, said grounded electrode being electrically connected with said first and second electrically conductive patterns through through-hole electrodes.

5. A temperature sensor as defined in claim 1 wherein said CR oscillating circuit is composed of a ceramic dielectric substrate formed by laminating a plurality of green ceramic dielectric sheets, each of said sheet having electrode and resistor pastes printed thereon, and then baking said laminated sheets, such that said ceramic dielectric substrate has capacitor and resistor means provided in an interior or on a surface of said substrate.

* * * * *